United States Patent
Sumimoto et al.

(10) Patent No.: US 7,161,328 B2
(45) Date of Patent: Jan. 9, 2007

(54) CONTROLLER OF ALTERNATOR FOR VEHICLE

(75) Inventors: Katsuyuki Sumimoto, Tokyo (JP); Junya Sasaki, Tokyo (JP); Kyoko Higashino, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 55 days.

(21) Appl. No.: 10/529,237

(22) PCT Filed: Sep. 25, 2003

(86) PCT No.: PCT/JP03/12260

§ 371 (c)(1),
(2), (4) Date: Mar. 25, 2005

(87) PCT Pub. No.: WO2005/031964

PCT Pub. Date: Apr. 7, 2005

(65) Prior Publication Data

US 2006/0017420 A1    Jan. 26, 2006

(51) Int. Cl.
*H02H 7/06* (2006.01)

(52) U.S. Cl. .......................... 322/28; 322/22; 323/283
(58) Field of Classification Search .................. 322/22, 322/25, 28, 18; 323/285, 283; 361/93.1, 361/93.7
See application file for complete search history.

(56) References Cited

U.S. PATENT DOCUMENTS

| 4,661,760 | A | * | 4/1987 | Goto et al. .................... 322/27 |
| 5,614,768 | A | | 3/1997 | Tanaka |
| 5,726,558 | A | * | 3/1998 | Umeda et al. ................. 322/27 |
| 5,731,689 | A | * | 3/1998 | Sato .............................. 322/25 |
| 6,734,653 | B1 | * | 5/2004 | Taniguchi et al. ............. 322/24 |
| 6,757,145 | B1 | * | 6/2004 | Takagi ........................ 361/93.1 |
| 6,815,933 | B1 | * | 11/2004 | Taniguchi et al. ............. 322/28 |
| 6,917,188 | B1 | * | 7/2005 | Kernahan .................... 323/282 |
| 6,940,259 | B1 | * | 9/2005 | Suzuki et al. .................. 322/20 |
| 6,979,987 | B1 | * | 12/2005 | Kernahan et al. ........... 323/283 |

FOREIGN PATENT DOCUMENTS

| JP | 5-304473 A | 11/1993 |
| JP | 2001-145397 A | 5/2001 |
| JP | 2001-258295 A | 9/2001 |
| JP | 2002-156393 A | 5/2002 |
| JP | 2003-79196 A | 3/2003 |

OTHER PUBLICATIONS

International Search Report for PCT/JP03/12260 dated Dec. 24, 2003.

* cited by examiner

*Primary Examiner*—Nicholas Ponomarenko
(74) *Attorney, Agent, or Firm*—Sughrue Mion, PLLC

(57) ABSTRACT

An alternator 1 connected to a battery mounted in a vehicle, a regulator 20 including a regulator IC 4 for adjusting a power generation voltage of the alternator 1, and an ECU connected to the regulator 20 are provided. A DF signal is inputted from the regulator 20 to the ECU 10. An average value obtained by performing an averaging process an ON time of the DF signal measured during predetermined sampling time is used as ON ratio information of the DF signal for reduction of a circuit size, optimization of the circuit, control stabilization, and cost reduction.

7 Claims, 6 Drawing Sheets

20: REGULATOR
CLK2: SAMPLING SIGNAL
GL: GATE LOGIC SIGNAL
RST: RESET SIGNAL

Tsw: FIELD SWITCH CYCLE
TSa: SAMPLING CYCLE

Tsw 1 to Tsw4: FIELD SWITCH CYCLE
TSb: SAMPLING CYCLE

FL: FIELD LOGIC SIGNAL

CONTROLLER OF ALTERNATOR FOR VEHICLE

TECHNICAL FIELD

The present invention relates to a control device for a vehicle alternator connected to a battery mounted in a vehicle, and driven by a vehicle engine for controlling a power generation voltage of the vehicle alternator. In particular, the present invention relates to a control device for a vehicle alternator, which achieves size reduction of a circuit, optimization of the circuit, control stabilization, and cost reduction.

BACKGROUND ART

Generally, in a control device for a vehicle alternator, an engine control ECU (electronic control unit) monitors a field switch ratio (DF: Duty of Field coil) to perform duty control of ON/OFF of a field current for appropriately controlling a power generation amount of the alternator. A DF signal monitored at this time is a PWM signal indicating power generation rate information of the alternator. The DF signal is generated by a regulator of the alternator. In general, the DF signal directly indicates the ON/OFF condition (energized condition/deenergized condition) of the field switch (power transistor).

However, the ON/OFF control of the power transistor is performed by the regulator based on pulse width modulation in the range of about 50 Hz to 200 Hz. Therefore, stability in the ON ratio in every cycle is not ensured, and the ON ratio is not stable. While the alternator operates, the ON ratio changes in every cycle in various patterns of large and small values regardless of the previous and next values, e.g., from 50%→70%→10%→ . . . .

For a conventional device JP 2001-258295, a technique is disclosed in which an averaging circuit including an average value latch circuit is provided for averaging external input signals to eliminate disturbance so that influence of the input signals having the disturbed frequency due to the disturbance noise can be reduced.

Further, JP 2001-145397A discloses a technique of rapidly correcting the variation in the value of the ratio of the DF signal in a case where the ON/OFF ratio of the applied voltage is searched based on a binary search method (repeating values between large and small values) using deviation between the voltage generated by the alternator and the target value. In this case, in searching the ON/OFF ratio of the applied voltage based on the binary search method, in order to improve the variation in the values of the ratios of the DF signal, an ON ratio of 0% or 100% is continuously outputted before searching for rapid correction. The value of the ratio changes up and down until it reaches the search depth limit.

DISCLOSURE OF THE INVENTION

In the conventional control devices for the vehicle alternator, as described above, the DF signal as one of input parameters used in the control includes irregular and various successive signals even for monitoring carried out at a certain period of intervals. Thus, the field switch ratio (DF signal) by the regulator changes in every cycle. Therefore, when the DF signal is directly received as a monitor signal, the control becomes unstable, and it is not possible to stabilize the control. Reliability in the control is not satisfactory.

Further, the circuit is complicated and the circuit size is large, which leads to high cost.

Further, in the conventional devices, since a certain number of duty sampling values are averaged, every duty frequency may differ. Thus, the sampling time (depending on the duty frequency) is not constant, and it is not possible to arbitrarily set the sampling time. The condition setting is not performed with flexibility.

The present invention has been made to solve the problems described above, and an object of the present invention is to provide a control device for a vehicle alternator which achieves reduction of the circuit size, optimization of the circuit, stabilization of the control, and cost reduction.

According to the present invention, there is provided a control device for a vehicle alternator, including: an alternator connected to a battery mounted in a vehicle; a regulator including a regulator IC for adjusting a power generation voltage of the alternator; and an ECU connected to the regulator, in which an average value obtained by performing an averaging process on ON time of a DF signal measured during predetermined sampling time is used as ON ratio information of the DF signal inputted from the regulator to the ECU.

BEST MODE FOR CARRYING OUT THE INVENTION

First Embodiment

Hereinafter, a control device for a vehicle alternator according to a first embodiment of the present invention will be described with reference to FIGS. 1 to 5.

Figure 1:
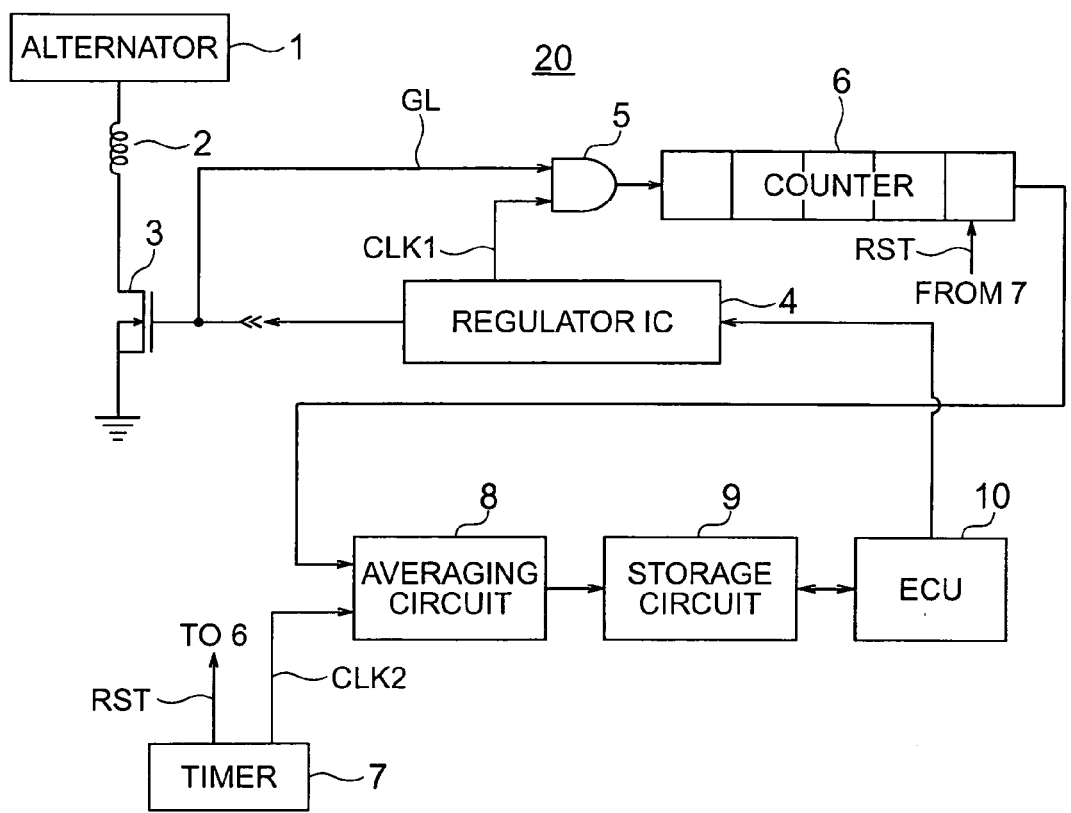
FIG. 1 is a block diagram showing a functional structure of a control device for a vehicle alternator according to a first embodiment of the present invention.

In FIG. 1, a field coil 2 provided at a rotor of an alternator 1 is connected to a power transistor 3 functioning as a field switching element.

A gate logic signal GL (control signal) from a regulator IC 4 is inputted to a gate terminal of the power transistor 3. The power transistor 3 is placed in the ON state or in the OFF state by the control signal for performing duty control of the field current flowing through the field coil 2.

The regulator IC 4 together with an AND gate 5, a counter 6, a timer 7, an averaging circuit 8, and a storage circuit 9 make up a regulator 20 for controlling a power generation voltage of the alternator 1.

Figure 2:
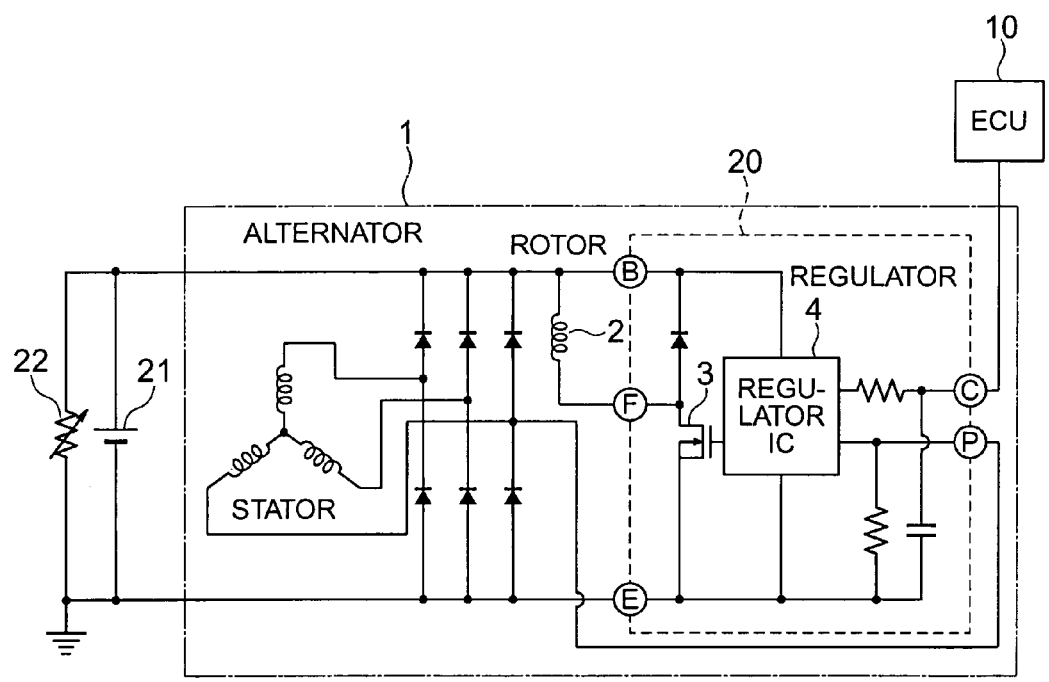
FIG. 2 is a circuit diagram schematically showing the control device for the vehicle alternator according to the first embodiment of the present invention and peripheral related components.

The regulator 20 is included in the alternator 1 (see FIG. 2).

The AND gate 5, the counter 6, the timer 7, the averaging circuit 8, and the storage circuit 9 maybe incorporated as a part of functions in the regulator IC 4.

The AND gate 5 performs a logical AND operation on a clock signal CLK1 of the counter 6 and the gate logic signal GL, and inputs to the counter 6 a logical product signal having a clock number corresponding to an H level segment of the gate logic signal GL.

Each time the logical product signal in response to the clock signal CLK1 is inputted to the counter 6, the counter 6 increments its counter value, and inputs the counter value corresponding to the duty ratio of the gate logic signal GL to the averaging circuit 8.

Further, each time an average value during sampling time arbitrarily set in advance is calculated, the counter 6 resets (clears) the counter value to 0 by a reset signal RST from the timer 7.

The timer 7 generates the reset signal RST at the time when a sampling signal CLK2 corresponding to the sampling time is generated. The sampling time (generation cycle of the sampling signal CLK2) is arbitrarily set in advance depending on the target specification.

Each time the sampling signal CLK2 is inputted to the averaging circuit 8, the averaging circuit 8 performs an averaging process of the counter value of the counter 6, and stores the average value in the storage circuit 9.

An ECU 10 reads the average value stored in the storage circuit 9, and inputs the average value to the regulator IC 4 as feedback information. In response to the input of the feedback information, the regulator IC 4 generates a control signal to the power transistor 3 for controlling the power generation voltage of the alternator 1.

In FIG. 2, the alternator 1 includes a stator having a three-phase wining and a three-phase rectifier circuit, a rotor having the field coil 2, and the regulator 20 including the power transistor 3 and the regulator IC 4.

The regulator 20 is connected to a stator circuit through output terminals B, E and a control terminal P of the alternator 1, connected to the field coil 2 through a field terminal F there of, and connected to the ECU 10 through a control terminal C there of.

A battery 21 and the electrical load 22 mounted in the vehicle are connected between the output terminals B and E of the alternator 1.

In FIGS. 1 and 2, the regulator IC 4 monitors the ON/OFF signal of the power transistor 3.

At this time, as shown in FIG. 1, the gate logic signal GL of the power transistor 3 is used as a DF signal for monitoring.

In the regulator 20, the logic AND operation of the clock signal CLK1 of the counter 6 and the gate logic signal GL is performed to input the clock signal CLK1 to the counter 6 while the gate logic signal GL is in the ON period, and the averaging process of the counter value is performed in each predetermined sampling time (in the cycle of the sampling signal CLK2).

Next, with reference to FIGS. 3 to 5, the averaging process according to the first embodiment of the present invention shown in FIGS. 1 and 2 will be described specifically.

Figure 3:
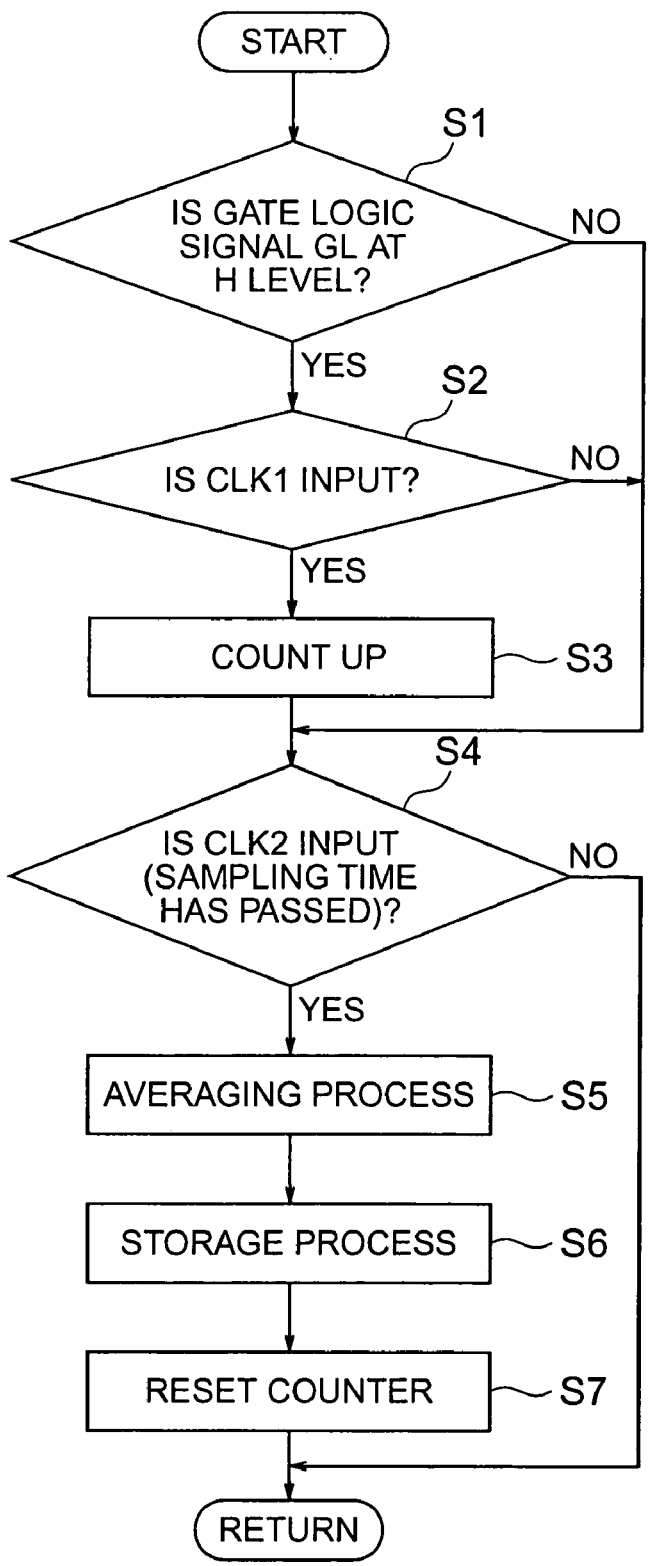
FIG. 3 is a flowchart showing an algorithm of processes according to the first embodiment of the present invention.

The process routine in FIG. 3 is performed by the regulator IC 4 in the regulator 20 in association with the respective constitutive elements 5 to 9.

In FIG. 3, firstly, it is determined whether the gate logic signal GL indicating the ON/OFF state of the power transistor 3 is at the H level (ON state) (step S1).

In step S1, if the gate logic signal GL is at the H level (i.e. YES), then, it is determined whether the clock signal CLK1 from the regulator IC 4 is inputted or not (step S2).

In step S2, if it is determined that the clock signal CLK1 is inputted (i.e., YES), the counter 6 counts up to increment the counter value (step S3). Then, the routine proceeds to step S4.

In step S1, if it is determined that the gate logic signal GL is at the L level (OFF state) (i.e., NO), or in step S2, if it is determined that the clock signal CLK2 is not inputted (i.e., NO), the increment process of the counter 6 (step S3) is not performed, and the routine proceeds to step S4.

Next, it is determined whether predetermined sampling time has elapsed or not is determined based on whether the sampling signal CLK2 from the timer 7 is inputted or not (step S4).

In step S4, if it is determined that the sampling signal CLK 2 is inputted (sampling time has passed) (i.e., YES), the averaging circuit 8 performs the averaging process using the sampled counter value and the sampling cycle (step S5).

Then, the average value (average field switch ratio) calculated by the averaging circuit 8 is stored in the storage circuit 9 (step S6), and the counter value of the counter 6 is cleared to 0 by the reset signal RST (step S7). Then, the process routine in FIG. 3 is finished, and the routine returns to step S1.

Thereafter, the processes in steps S1 to S7 are repeated.

The average field switch ratio in the storage circuit 9 is transmitted to the ECU 10 in response to an output instruction performed at an arbitrary time.

In step S4, if it is determined that the sampling signal CLK 2 is not inputted (sampling time has not passed) (i.e., NO), the process routine in FIG. 3 is finished, and the routine returns to step S1 without performing the processes in steps S5 to S7.

As described above, the sampling time is arbitrarily set in advance by a user (designer).

Figure 4:
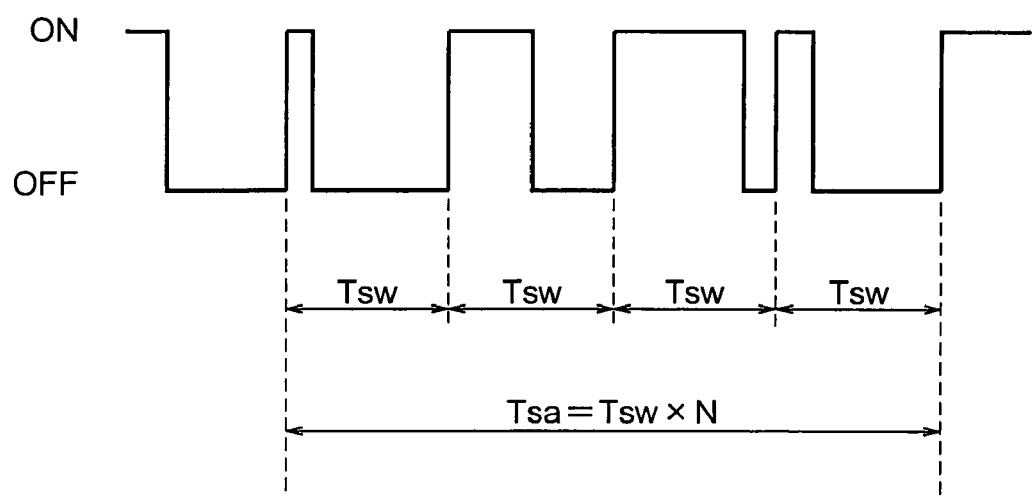
FIG. 4 is a timing chart showing sampling operation according to the first embodiment of the present invention, showing a sampling cycle TSa in a case where field switch cycles Tsw are constant.

For example, as shown in FIG. 4, when field switch cycles Tsw of the power transistor 3 are always constant, the generation cycle of the sampling signal CLK2 is set such that sampling of the counter value is performed in each cycle which is N times as long as the field switch cycle Tsw (Tsw×N).

The integral number N can be set to an arbitrary number which is 2 or greater. When the integral number N is a significantly large number, the responsiveness until the averaging information can be obtained is lowered. Therefore, it is desirable that the value of the integral number N is set in a practical range according to the required specification of the overall system.

As shown in FIG. 3, when the sampling cycle TSa (=Tsw×N) is set, an average field switch ratio Ka is a value (To/TSa) calculated by dividing the ON time To of the gate logic signal GL (corresponding to the counter value) by the sampling cycle TSa.

Figure 5:
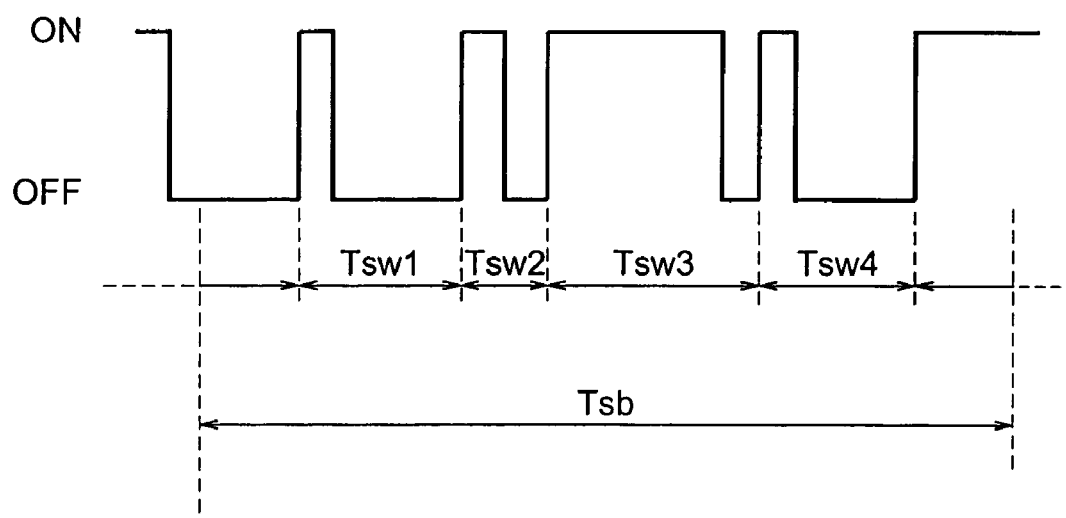
FIG. 5 is a timing chart showing sampling operation according to the first embodiment of the present invention, showing a sampling cycle TSb in a case where field switch cycles Tsw1 to Tsw4 are not constant.

As shown in FIG. 5, when the field switch cycles Tsw1, Tsw2, Tsw3, and Tsw4 vary in each control timing, the generation cycle of the sampling signal CLK2 is set such that the sampling cycle TSb is much longer than the longest field switch cycle Tsw3.

In this case, the average field switch ratio Kb obtained in the averaging process (step S5) is "To/Tsb".

In this manner, it is possible to obtain information of the stable field switch ratio by the averaging process.

The averaging process may be performed by a divider circuit. However, in order to avoid increase in circuit size, for example, a known technique such as a bit shift is used for the counter.

As described above, an ON time To of the gate logic signal GL in the arbitrary sampling time is measured by the counter 6 for averaging the ON time To to calculate the average field switch ratio. Thus, it is possible to obtain the stable field switch ratio as ON ratio information of the DF signal. In this case, the circuit size is not large.

Further, when the ECU 10 monitors the field switch ratio, disturbance by irregular signals before and after the monitoring does not occur. Therefore, it is possible to obtain the DF signal which is stable to some extent, and realize the stability in the engine control by the ECU.

Accordingly, it is possible to reduce the circuit size, and stabilize the engine control.

Since it is possible to select the sampling time and the algorithm for the averaging process arbitrarily to some extent, the circuit is optimized easily, and cost reduction is achieved.

Further, since all the processes are performed on the control side of the alternator (on the side of the regulator 20), the stable signals are supplied to various control devices without selecting the specification of the ECU 10 mounted in the vehicle.

Further, the circuit is configured by the functions in the regulator IC 4 without requiring any complicated circuits such as a divider circuit or a delay circuit, the circuit size is reduced significantly.

Second Embodiment

In the first embodiment of the present invention, the gate logic signal GL of the power transistor 3 is used as the ON/OFF signal indicating the field switch ratio. Alternatively, a signal on a side of a collector terminal (on a side of a drain terminal) of the power transistor 3 may be used.

Figure 6:
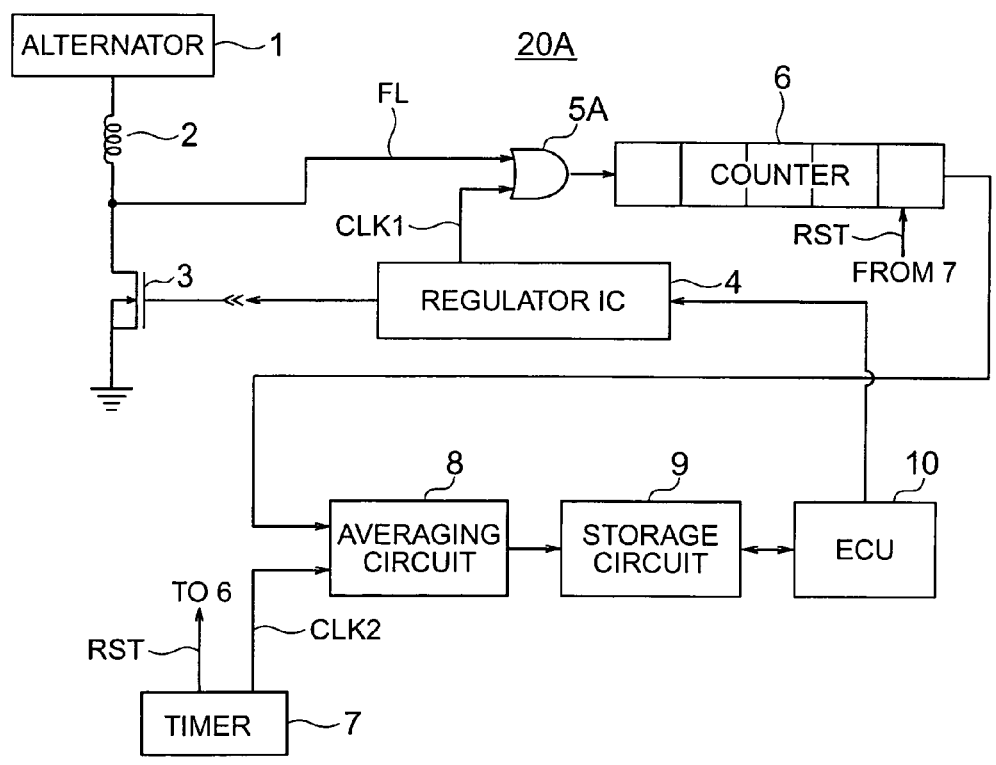
FIG. 6 is a block diagram showing a functional structure of a control device for a vehicle alternator according to a second embodiment of the present invention, showing a case where a signal on a side of a collector terminal of a power transistor is used as an ON/OFF signal indicating a field switch ratio.

FIG. 6 is a block diagram showing a control device for a vehicle alternator according to a second embodiment of the present invention in which a field logic signal FL on the side of the collector terminal of the power transistor 3 is used as a monitor signal.

In FIG. 6, the constituent elements that are identical to those shown in FIG. 1 are labeled with the same reference numeral or the same reference numeral with suffix "A", and description thereof will be omitted.

In this case, since the logic of the monitor signal inputted to the regulator 20A has a reverse polarity, the regulator 20A has an OR gate 5A instead of the AND gate 5 as described above with reference to FIG. 1.

The OR gate 5A receives the field logic signal FL on the side of the collector terminal of the power transistor 3, and performs an OR operation to input the signal having the reverse polarity as a logical sum signal to the counter 6.

That is, in the OFF period of the field logic signal FL (corresponding to the ON period of the gate logic signal GL), the OR gate 5A passes the OFF pulse of the clock signal CLK1 such that the counter 6 counts up.

Thereafter, the same processes as described above are performed. Thus, the same effects and advantages can be achieved also in this case.

The invention claimed is:

1. A control device for a vehicle alternator, comprising:
    an alternator connected to a battery mounted in a vehicle;
    a regulator including a regulator integrated circuit (IC) for adjusting a power generation voltage of the alternator; and
    an electronic control unit (ECU) connected to the regulator,
    wherein an average value obtained by performing an averaging process on an ON time of a duty of field coil (DF) signal measured during predetermined sampling time is used as an ON ratio information of the DF signal inputted from the regulator to the ECU.

2. A control device for a vehicle alternator according to claim 1, wherein the regulator IC comprises:
    a power transistor for performing ON/OFF control of a field current of the alternator;
    a counter for measuring the ON time of the DF signal as a counter value, the counter value being cleared to 0 by a reset signal;
    a timer for generating a sampling signal and the reset signal in each sampling time;
    an averaging circuit for performing an averaging process on the counter value in response to the sampling signal; and
    a storage circuit for storing the average value calculated by the averaging circuit.

3. A control device for a vehicle alternator according to claim 1 or 2, wherein the sampling time is set to an arbitrary value in advance.

4. A control device for a vehicle alternator according to claim 2, wherein the DF signal is a gate logic signal of the power transistor.

5. A control device for a vehicle alternator according to claim 4, wherein the regulator IC includes an AND gate, and the AND gate inputs a clock signal to the counter during an ON period of the gate logic signal.

6. A control device for a vehicle alternator according to claim 2, wherein the DF signal is a field logic signal on a side of a collector terminal of the power transistor.

7. A control device for a vehicle alternator according to claim 6, wherein the regulator IC includes an OR gate, and the OR gate inputs a clock signal to the counter during an OFF period of the field logic signal.

* * * * *